(12) United States Patent
Norman Rose et al.

(10) Patent No.: US 9,057,658 B2
(45) Date of Patent: Jun. 16, 2015

(54) VEHICLE TYRE PRESSURE CHECKING

(75) Inventors: Peter Norman Rose, High Wycombe (GB); Paul Michael Taylor, Witney (GB)

(73) Assignee: Wheelright Limited (GB)

( * ) Notice: Subject to any disclaimer, the term of this patent is extended or adjusted under 35 U.S.C. 154(b) by 0 days.

(21) Appl. No.: 14/240,003

(22) PCT Filed: Jul. 23, 2012

(86) PCT No.: PCT/GB2012/051765
§ 371 (c)(1),
(2), (4) Date: Jun. 3, 2014

(87) PCT Pub. No.: WO2013/027010
PCT Pub. Date: Feb. 28, 2013

(65) Prior Publication Data
US 2014/0316645 A1 Oct. 23, 2014

(30) Foreign Application Priority Data

Aug. 22, 2011 (GB) .................................. 1114366.6

(51) Int. Cl.
*G01G 19/02* (2006.01)
*G01L 17/00* (2006.01)
*G01L 1/14* (2006.01)

(52) U.S. Cl.
CPC ................. *G01L 17/00* (2013.01); *G01L 1/146* (2013.01); *G01L 17/005* (2013.01); *G01G 19/024* (2013.01)

(58) Field of Classification Search
CPC .... G01G 19/024; G01L 17/005; G01L 1/146; G01L 17/00
USPC .......................................................... 701/34
See application file for complete search history.

(56) References Cited

U.S. PATENT DOCUMENTS 4,630,470 A * 12/1986 Brooke et al. ................ 73/146.2
5,396,817 A * 3/1995 Rosensweig ................. 73/146.2

(Continued)

FOREIGN PATENT DOCUMENTS

EP 0545641 A2 11/1992
EP 0656269 A1 11/1994

(Continued)

OTHER PUBLICATIONS

International Search Report and Written Opinion, PCT International Application No. PCT/GB2012/051765, dated Oct. 31, 2012.

(Continued)

*Primary Examiner* — Mary Cheung
*Assistant Examiner* — Frederick Brushaber
(74) *Attorney, Agent, or Firm* — McDonnell Boehnen Hulbert & Berghoff LLP (57) ABSTRACT

A sensor array (13) for checking the pressure of a vehicle tire while being moved over the array comprises two sets (14) and (19) of aligned, facing sensor members. The first set (14) of sensor members is formed by slits (15) cut into a plate of metal to form first fingers (16) connected in cantilevered fashion to a first base portion (17), which extend in the direction of intended vehicle movement to free ends (18). The second set (19) of sensor members is formed by slits (20) cut into a plate of metal to form second fingers (21) connected in cantilevered fashion to a second base portion (22), which extend in the reverse of the direction of intended vehicle movement to free ends (23). The fingers of the two sets are aligned and the free ends (18) and (23) are closely adjacent. Each finger is provided with a load sensing system (28, 29) which provides an indication of the load on the finger as the tire moves over the finger. Loads are applied to different positions along the fingers as the tire moves over the array. The sensitivity of the array increases from a minimum for a load applied where the first fingers (16) are attached to the first base portion (17), to a maximum adjacent the free ends (18, 23) of the first and second fingers (16) and (21), and then decreases to a minimum where the second fingers (21) are attached to the second base portion (22). The fingers may be replaced by series of individual sensing elements (42) arranged in groups so as to constitute sensor members, whose outputs are weighted so that the sensitivity varies in a similar manner along a sensor member.

24 Claims, 5 Drawing Sheets

(56) References Cited

U.S. PATENT DOCUMENTS

| | | | |
|---|---|---|---|
| 5,445,020 A * | 8/1995 | Rosensweig | 73/146.2 |
| 5,942,681 A * | 8/1999 | Vollenweider et al. | 73/146.2 |
| 6,626,035 B1 * | 9/2003 | Dent et al. | 73/146.2 |
| 6,700,174 B1 | 3/2004 | Miu et al. | |
| 7,032,454 B2 * | 4/2006 | Amano | 73/704 |
| 7,104,134 B2 * | 9/2006 | Amano et al. | 73/704 |
| 2002/0102743 A1 | 8/2002 | Majumdar | |
| 2012/0101746 A1 * | 4/2012 | Taylor et al. | 702/50 |

FOREIGN PATENT DOCUMENTS

| | | |
|---|---|---|
| EP | 0729855 A1 | 9/1996 |
| GB | 2470903 A1 | 12/2010 |
| WO | WO00/11442 | 3/2000 |
| WO | WO2006/003467 A1 | 1/2006 |
| WO | WO2010/142942 A1 | 12/2010 |

OTHER PUBLICATIONS

GB Search Report, GB Application No. GB1114366.6 dated Nov. 18, 2011.

* cited by examiner

VEHICLE REGISTRATION XX99YYY

DATE 1 January 2012

TIME 14:53:32

| TYRE | PRESSURE bar |
|---|---|
| Front Left | aa |
| Front Right | bb |
| Rear Left | cc |
| Rear Right | dd |

VEHICLE TYRE PRESSURE CHECKING

CROSS REFERENCE TO RELATED APPLICATIONS

The present application is a national stage entry of PCT/GB2012/051765, filed Jul. 23, 2012, and claims priority to GB 1114366.6, filed Aug. 22, 2011. The full disclosures of GB 1114366.6 and PCT/GB2012/051765 are incorporated herein by reference.

This invention relates to a system for checking the pressure in a vehicle tyre, using an array of sensors.

There have been a number of proposals for checking the pressure of a vehicle tyre whilst it passes over an array of sensors. These may rely on the assumption that the contact pressure is an approximation of the tyre inflation pressure. The contact area of a tyre with a surface can be taken as the weight borne by the tyre, divided by the tyre inflation pressure. As the tyre inflation pressure decreases, the contact area increases, although the relationship depends on the structural properties of the tyre. For example, at very low inflation pressures the reinforced sidewalls of the tyre will take a significant portion of the load directly. An alternative approach relies on investigating the lateral profile of the tyre footprint. If a tyre is over-inflated, there will be a narrow, relatively sharp profile. If a tyre is under-inflated, there will be a wider, relatively flat profile. Examples of such systems are disclosed in WO 00/11442, EP 0545641 and EP 0656269.

In some cases there may be a two dimensional array of sensors, and in others there may be a linear array of sensors. In either case, outputs from the sensors are sampled at intervals as the tyre passes over. These outputs may be used to indicate the shape of the tyre footprint. In the case of a linear array of sensors, or a two dimensional array of limited extent in the direction of travel, the shape of the tyre footprint is obtained indirectly. A row of sensors extending across the tyre will always stay in contact with the same portion on the circumference of the tyre. That portion's position in the tyre footprint will alter, and the length of the line of contact will increase from initial contact, and then decrease until contact ceases. The shape of the tyre footprint is extrapolated from the sensor data.

In WO 2006/003467 there is disclosed a system which uses a linear array of sensors, and the output data is from a line of contact at a circumferential position on the tyre. Some calculations are made based on the areas of the individual sensors, and for some purposes there is provided an estimate of the area of the tyre footprint.

In U.S. Pat. No. 5,942,681 there is disclosed a linear array of sensors for use in calculating tyre pressure, each of which has a head which is oblong, with the longer dimension extending in the direction of travel of a wheel and bridging a number of tread gaps. The head is connected to a relatively small piezo-electric sensor.

In WO 2010/142942 there is disclosed a system in which a linear array of sensors is positioned on a platform which is itself supported on load sensors. The tyre pressure is calculated using the outputs from the two sets of sensors, without the need to determine the area of the tyre footprint. In a preferred method, there is used a relationship between the load on the sensors in the linear array and the pressure in the tyre, which is dependent on the total load borne by the tyre. In one described arrangement, the tyre bears down on elongate actuators which in turn press down on a small area of a sensor. In one arrangement the actuator bears down on the centre of a beam supported at both ends. In an alternative arrangement the beam is supported at one end only, in cantilever fashion.

An object of one aspect of the present invention is to provide an improved sensor array for use in measuring the pressure of a tyre as the tyre moves over the array.

Viewed from one aspect of the invention, there is provided apparatus for checking the inflation pressure of a vehicle tyre whilst moving in an intended direction of travel, comprising a sensor array extending in a lateral direction with respect to the intended direction of travel, wherein the sensor array comprises a first set of laterally spaced first sensor members each of which is elongate and extends from a first end to a second end in a first longitudinal direction perpendicular to said lateral direction, so that loads are applied to different positions along the first sensor as the tyre moves over the array; wherein each first sensor member is provided with a respective load sensing system which provides an output representing the load on the sensor member as a tyre moves over the array, and there is provided a processing module which processes outputs from the load sensing systems of the first sensor members and provides data representing the pressure of the tyre; and wherein the sensitivity of each first sensor member increases from a minimum for a load applied at the first end of the first sensor member, to a maximum for a load applied at the second end of the first sensor member.

In some embodiments of the invention, there is a second set of laterally spaced second sensor members each of which is elongate and extends from a first end to a second end in a second longitudinal direction opposite to said first longitudinal direction, so that loads are applied to different positions along the second sensor as the tyre moves over the array; the second ends of the second sensor members being adjacent the second ends of the first sensor members; wherein each second sensor member is provided with a respective load sensing system which provides an output representing the load on the sensor member as a tyre moves over the array, and the processing module also processes outputs from the load sensing systems of the second sensor members to provide the data representing the pressure of the tyre; and wherein the sensitivity of each second sensor member increases from a minimum for a load applied at the first end of the second sensor member, to a maximum for a load applied at the second end of the second sensor member.

Viewed from another aspect of the invention, there is provided a method of checking the inflation pressure of a vehicle tyre, comprising the step of moving the vehicle tyre in said intended direction of travel over apparatus as described above, and processing the outputs from the load sensing systems to provide data representing the pressure of the tyre.

In embodiments of the invention, the varying sensitivity which increases from a minimum at the first end of a sensor member to a maximum at the second end of a sensor member, is such that for a given load applied at the first end of the sensor member, the output from the load sensing system for that sensor member will be less than if the same load is applied at points along the sensor member towards the second end of that sensor member. The sensitivity preferably increases progressively from the first end of the sensor member towards the second end of the sensor member.

By providing varying sensitivity of the sensor members as the tyre passes over them, it is possible to obtain more accurate data. This is particularly so in some embodiments, in which there is both a first set of sensor members and a second set of sensor members. As a tyre moves over apparatus in such embodiments, there will be an increase in the sensitivity of the first sensor members from a zero value adjacent their first ends, to a maximum value adjacent their second ends. At that point if there was no further sensor member, the sensitivity would drop suddenly to zero. A sudden change in sensitivity can provide spurious or inaccurate results. By providing a facing array of second sensor members with their second ends adjacent the second ends of the first sensor members, those second sensor members come into play, with their maximum sensitivity being at their second ends and thus maintaining maximum sensitivity for the system as a whole. The sensitivity of the second sensor members and thus the system as a whole will then reduce gradually to zero adjacent the first ends of the second sensor members. Thus, for the overall system there is gradual increase from zero to maximum sensitivity and then a gradual decrease back to zero again. By avoiding a sudden increase or decrease in sensitivity, more reliable data can be obtained. This is particularly the case if there is a gap in the tyre tread pattern in the region of the ends of the sensor members.

In some embodiments of the invention each first sensor member is in the form of a beam which extends from a first support at the first end of the first sensor member to the second end of the first sensor member. In such embodiments where there also is a second set of sensor members, preferably each second sensor member is in the form of a beam which extends from a second support at the first end of the second sensor member to the second end of the second sensor member.

In embodiments where there is both a first set of first sensor members and a second set of second sensor members, preferably the first sensor members are separate from, i.e. are not joined to, the second sensor members. Thus the second ends of the first sensor members are free ends, and second ends of the second sensor members are free ends. The inventors have established that where the first and second sensor members are in the form of beams, an arrangement in which the second ends of first and second sensor members are joined to form continuous sensor members can cause problems with crosstalk between laterally adjacent continuous sensor members. By using separate pairs of first and second sensor members, each of which extends in cantilevered fashion from its respective support, strain induced on one cantilevered sensor member may move a laterally adjacent sensor member, but because the free end is not tied, it does not induce a significant strain in that laterally adjacent sensor member and so crosstalk is eliminated or significantly reduced.

In some embodiments of the invention, each elongate sensor member is in the form of a beam. As the tyre moves over an elongate sensor member in the form of a beam, an increasing amount of the footprint of the tyre will come into contact with the beam. The total amount of strain in the beam at any time will depend on the total bending moment of the applied forces. This will be the sum of the individual bending moments produced at points along the beam where it is in contact with the tyre footprint, and that depends on the force at each point and the distance that the point is from said one end of the beam. If the beam behaves in a linear manner, the bending moment MP on the beam produced by a force FP at a point P will be: FP×DP, where DP is the distance of point P from the start of the beam. The total bending moment on the beam will be the sum of these individual contributions. It will be noted that the beam need not be of constant thickness along its length.

It will be appreciated that the same effect could be obtained in alternative ways. For example, instead of a sensor member in the form of a physical beam, there could be a sensor member comprising a number of longitudinally arranged individual sensing elements. The individual sensing elements could be of any known type, such as piezoelectric, piezoresistive, capacitive, electromagnetic, quantum tunneling composites, hydraulic, pneumatic, optical, mechanical, electromechanical and so forth. In such an arrangement the "sensing system" for a given sensor member will comprise these individual sensing elements. It is necessary for the outputs of the sensing elements, for use in calculations, to be such that for a given force applied on a sensing element at the first end of the sensor member the output will be less than that for the same force applied on a sensing element further along the sensor member towards the second end. One way of achieving this would be to vary the nature of the sensing element itself. For example, there might be a sensing element whose electrical properties change in accordance with both the applied force and the thickness of the sensing element. By continuously varying the thickness of the sensing elements from one end of the sensor member to the other, it can be arranged that the sensitivity of the sensor member depends on how far along the sensor member a force is applied.

Additionally or alternatively, the outputs of the individual sensing elements could be manipulated electrically, electronically or by computer software so that their outputs for a given load are varied in accordance with their distance along the sensor member, before being used in calculations. For example, it would be possible to apply a weighting function to signals coming from the sensing elements. For a sensing element at the start of the sensor member, the weighting could be a minimum such as 5% or 10%. Each subsequent sensing element along the sensor member would have a progressively increasing weighting until the sensing element at the far end of the sensor has a maximum weighting of say 100%. In such an arrangement, the "sensing element" for a given sensor member comprises not only the individual sensing elements but also that part of the data processing system that manipulates the outputs of the sensing elements.

Thus, in some embodiments of the invention, each sensor member is in the form of a series of longitudinally spaced sensing elements so that loads are applied to different sensing elements of a sensor member as the tyre moves over the array, the outputs of the sensing elements having a weighting which increases from a minimum for a load applied to a sensing element at the first end of the first sensor member, to a maximum for a load applied to a sensing element at the second end of the first sensor member. The weighting may be obtained by manipulation of the outputs of the sensing elements.

In embodiments of the invention, a sensor member has the load of a tyre applied at different points along its length as that the tyre moves over the sensor array. A sensor member that is entirely within the footprint of a tyre will have the load of the tyre applied along the length of the sensor member (ignoring the effect of tread gaps). This arrangement differs from that in WO 2010/142942 in which each beam is acted on at a single point by a separate actuator which is mounted in a guide and has a head that engages the tyre. There is a single level of sensitivity as a tyre moves over the sensor array. The tyre is either on the array or is off it, and the force is always transmitted to a single point on each beam by an actuating portion. Furthermore, by applying the load from the tyre directly to the sensor members, a more robust and simpler construction is provided.

In use of a system in accordance with the invention, in some embodiments where there is both a first set of sensor members and a second set of sensor members, as a tyre moves forwards over the array, there will generally be an increase in combined sensor member output of a pair to a maximum which will generally be where the axle, i.e. the axis of a wheel on which the tyre is, is located above the region of the ends of two facing sensor members, and then there will be a decrease until the tyre has moved past the array. However whilst the maximum output is likely to be in that general region it will not necessarily be at the precise second end of the first sensor member or of the second sensor member, even though that is the place of maximum sensitivity. A number of factors such as the influence of the tread pattern will affect where the maximum sensor output will be.

The outputs from the individual sensing systems of a pair of opposing first and second sensor members may be combined in a number of different ways, mathematically. For example, the outputs of a pair can be added together and that then used in the calculations, one stage in the calculations taking into account that the figures are for a pair of sensor members rather than a single sensor member. The outputs of the pair could be averaged and that average used in the calculations. Alternatively, the calculations could be carried out separately on the first set of sensor members, separately on the second set of sensor members, and then the two results averaged.

Preferably, in each set of sensor members, the individual sensor members are parallel to each other. Preferably the first set of sensor members is parallel to the second set of sensor members. Preferably, each of the first sensor members in the first set has its longitudinal axis aligned with the longitudinal axis of a respective second sensor member in the second set. In that case, the second ends of the two sensor members in a pair will face each other. However, it might be possible for there to be a degree of lateral displacement of the first sensor member in a pair with respect to the second sensor member in the pair. In general, the intended direction of travel of a tyre over the array of sensor members will be perpendicular to the lateral direction of the array, but it might be possible for the lateral direction to be at an angle to the intended direction of travel. In general, where it is said that the intended direction of travel is perpendicular to the lateral direction of the array, or that a sensor member is elongate in a longitudinal direction perpendicular to said lateral direction, this does not imply that there must be absolute geometrical perpendicularity. Some degree of variation may be acceptable. Indeed, in some cases it might be desirable to angle the sensor members deliberately away from true perpendicular, for example by up to about 15° or even more. Where there are first and second sets of sensor members, all of the sensor members could be inclined in the same sense. In an alternative arrangement, the first sensor members of the first set could be inclined away from true perpendicular in one sense, and the second sensor members of the second set could be inclined away from true perpendicular in the opposite sense, so that the first sensor members and the second sensor members form a chevron pattern. This may be of use if the apparatus is to be used with tyres having very coarse tread patterns Where each sensor member is a beam, in some embodiments each first sensor member is of constant width and depth along its length. Preferably each first sensor member has the same width and depth as each other first sensor member. Preferably each first sensor member is of the same length. Preferably the spacing between adjacent first sensor members is the same. Preferably each first sensor member is a cantilevered beam. In embodiments where there is a set of second sensor members, preferably each second sensor member is of constant width and depth along its length. Preferably each second sensor member has the same width and depth as each other second sensor member. Preferably each second sensor member is of the same length. Preferably the spacing between adjacent second sensor members is the same. Preferably each second sensor member is a cantilevered beam. Preferably each second sensor member has the same width, depth and length as each first sensor member. Preferably the spacing between adjacent second sensor members is the same as the spacing between adjacent first sensor members. Preferably each second sensor member is aligned longitudinally with a respective first sensor member.

In a preferred arrangement, the second set of second sensor members is a mirror image of the first set of first sensor members.

A problem with the design of a linear sensor array for use in determining tyre pressure is the need for accuracy whilst being sufficiently robust to withstand the loads imposed by vehicles. It is envisaged that sensor systems for determining tyre pressure will be used in heavy goods vehicle environments, where tyre pressures can be checked as a vehicle leaves or returns to a depot. Significant loads will be imposed by such vehicles. The use of cantilevered sensor elements, on which a vehicle tyre engages directly, enables a simpler and more rugged construction to be used, suitable for continued use by multiple heavy vehicles such as trucks and buses, as well as cars and vans.

In particular, in some embodiments the sensor members may be made from solid metal or other generally rigid material, for example by means of spaced longitudinal gaps such as cuts in a relatively thick sheet of the material to leave the laterally spaced sensor members in the form of cantilevered "fingers". Typically the sensor members may have a thickness or depth of between about 6 and about 14 or 18 mm, for example being in a range of between about 11.5 and about 12.5 mm. It is now considered that it is not always necessary to have such high resolution in the lateral direction as discussed in WO 2006/003467. Typically, a sensor member may have a width of between about 5 and about 10 or 15 mm, for example being in a range of between about 7 and about 8 mm. The lateral spacing between adjacent sensor members of a set may be between about 0.1 and about 1.0 mm, for example being in a range of between about 0.5 and about 0.9 mm. Typically, each sensor member may have a length (from its connection to its base portion to its free end) of between about 30 and about 100 mm, for example being in a range of between about 48 and about 52 mm. The length is preferably sufficient to bridge at least two tread gaps in a typical tyre. Sensor members as described above will deflect resiliently by a relatively small amount when bearing their share of the load of a heavy vehicle such as a truck or bus, but will also be sensitive to a lighter vehicle such as a car. By way of example only, a sensor which is 50 mm long will normally have a maximum deflection at its free end of between about 0.11 and about 0.05 mm in normal use.

In embodiments of the invention, preferably the spacing between the ends of aligned first and second sensor members is no more than about 2 mm, for example being in a range of between about 0.5 and about 1 mm.

In some embodiments of the invention the sensor members will bear the load from the tyre directly, rather than through an actuating portion. It will be appreciated that the expression "directly" includes the tyre bearing on the sensor members through a cover sheet, such as a flexible sheet of polymeric material, or a sheet of relatively thin metal such as steel which may or may not be adhered to the array of sensor members.

In the case of sensor members in the form of beams the load sensing system as such could be generally as described in WO 2010/142942. Each sensor member may have an upper surface on which the load is applied, and a lower surface provided with at least two sensing portions spaced along its length, each sensing portion having electrical properties which vary in accordance with applied stress, and the sensing portions are connected electrically as nodes in a bridge arrangement and means are provided for providing an electrical input to the bridge and for detecting an electrical output from the bridge. There could be two sensing portions, connected in a half bridge arrangement, or four sensing portions connected in a full Wheatstone bridge arrangement. It is conceivable that a single sensing portion could be used in a quarter bridge arrangement. The sensing portions could be thick film, or thin film or a strain gauge, for example or any other device having electrical properties which vary in accordance with applied stress.

The sensor in accordance with the present invention may be used in place of the linear sensor array in an arrangement such as that disclosed in WO 2010/142942, in which the array is mounted on a base that is provided with one or more load sensors to measure the total load. Thus preferably, the sensor array is mounted on a platform which is mounted over a base and which is of sufficient extent in the intended direction of travel and laterally of the intended direction of travel to accommodate the entire footprint of a vehicle tyre, there being a load sensor system arranged between the platform and the base, for providing data indicative of varying loads exerted on the base by the platform whilst the tyre is moved over the platform in the intended direction of travel.

However, the sensor array may be used in conjunction with an alternative arrangement for measuring the total load. This could be a separate station where the load is measured, but preferably the total load is measured at the same time as the sensor array outputs are measured, so that the same conditions, such as speed or acceleration, apply.

By using the outputs from the sensor array on the platform and the output from a total load measuring system such as a load system between the base and the platform, it is possible to determine the tyre pressure using a method generally as disclosed in WO 2010/142942, without having to use the area of the tyre footprint. In some embodiments, the basis of this method is that there is a relationship between the pressure on a sensor member and the pressure in the tyre, but this relationship is dependent on at least the total load carried by the tyre. Since the pressure on a sensor member can be determined and also the total load through the tyre, it is possible to determine the tyre pressure. If there are other factors that affect the relationship, such as temperature, these can be determined and taken into account also in the calculation.

Even if not having a total load measuring system, a general indication of the tyre pressure can be determined without it being necessary to calculate the tyre footprint area. If a pressure sensor member has a portion in contact with the surface of a tyre, then there is a basic relationship between the tyre inflation pressure and the force detected by the sensing element which can be expressed as:

$$P=aF_s+b \qquad (1)$$

where P is the inflation pressure, Fs is the load on the sensor member, and a and b are constants, the values of the constants depending on the construction of the tyre, such as the effect of the inherent properties of the materials concerned, and the design of the apparatus, such as the contact area of the sensor member. Thus, by obtaining a representative sensor member load value which can be used as $F_s$ the tyre pressure P can be calculated. In some embodiments $F_s$ can be a load and in others $F_s$ can be a pressure, the value of the constant (a) depending on whether a load or pressure value is given.

Thus, preferably the data processing means is configured to provide at least one representative load value from the array of sensors and the data processing system is configured to provide an indication of the inflation pressure of the tyre using this representative load value.

By a "representative" load value, is meant a value that is a reasonable indication of the load on a sensor member that is clear of interferences such as sidewall effects or tread gaps. The representative value could be, for example, that obtained from a sensor member providing the highest reading; an average (whether mean, median, mode and so forth) from a range of sensor members providing the highest readings; an average from a range of sensor members, excluding extreme values, low or high; an average from all sensor members; and so forth. In some embodiments of the invention, and as discussed in more detail later, a weighted average is used.

With an arrangement having a total load measuring system, the total load may be used in the calculation of the tyre pressure. As noted above from equation (1) there is a basic relationship between the tyre inflation pressure, and the load on a sensor member in the array provided on the platform. The conventional approach is that for a given tyre pressure, as the load on the tyre increases, the tyre footprint expands and the load is spread over a greater area, and that this results in the pressure on the surface under the tyre remaining constant. However, as explained in WO 2010/142942 it has been established that the equation (1) may be accurate only for a constant tyre load. If a tyre acted as a simple balloon, then as the vehicle weight increased, the load on a tyre would increase but the tyre's footprint would also expand, so that the pressure remains constant. However, the physical characteristic of a normal vehicle tyre are not those of a balloon and the tyre stiffness, for example, affects the behaviour. Thus, as the share of the vehicle's weight borne by the tyre is varied, the pressure on an individual sensor member varies. This can be expressed as stating that at least one of the constants a and b in equation (1) is not a true constant but varies as a function of the total load.

Further constants may be involved in the relationship and a possible relationship is:

$$P=aF^b+cW^d+e \qquad (2)$$

where P is the inflation pressure, F is the load on the sensor member and W is the total load exerted through the tyre, and a, b, c, d and e are all constants. If the system determines the pressure on a sensor member, then F can be the pressure and a different value used for the constant a.

Thus, by obtaining a representative sensor member load value for a range of known tyre pressures and for a range of known total loads on the tyre, it is possible to build up a relationship or to plot values for the tyre pressure associated with particular representative sensor member load values and total loads.

For use in an arrangement using a load sensor system between a platform and a base there could be a single load sensor to measure the total load from the platform. This sensor could be distributed underneath the platform, for example being a tube containing a gas or liquid which is connected to a pneumatic or hydraulic sensor. The tube could follow a serpentine path.

However, in some embodiments the load sensor system between the platform and the base comprises a plurality of sensors at points distributed longitudinally and laterally over the base, to indicate the loads on the base from the platform at various points. The outputs from these sensors may be used to calculate the total load or in various ways, as discussed in WO 2010/142942, for example to determine the speed and/or acceleration and/or direction of movement of the tyre, the total load on the platform, the position of the tyre on the platform so as to initiate sampling of the outputs from the second sensors, and so forth.

In embodiments of the invention, the outputs from the sensing systems associated with the sensor members are sampled at intervals, for example at a sampling rate of between about 300 and about 700 Hz, preferably between about 400 and about 600 Hz, and for example between about 500 and about 550 Hz. The sampled data is processed by data processing means to provide information concerning the tyre pressure. In one such embodiment, as in WO 2010/142942, the data processing system is configured to provide at least one representative load value from the array of sensors and to provide an indication of the inflation pressure of the tyre using this representative load value.

By a "representative" load value, is meant a value that is a reasonable indication of the load on an ideal sensor that is clear of interferences such as sidewall effects The representative value could be, for example, that obtained from a sensor member providing the highest reading; an average (whether mean, median, mode and so forth) from a range of sensor members providing the highest readings; an average from a range of sensor members, excluding extreme values, low or high; an average from all sensor members; a weighted average from selected sensor members and so forth. There could be a plurality of representative sensor member load values, to give a load value profile across the width of the tyre. This would enable there to be an indication of tyre pressure, to the extent of indicating whether the profile is consistent with normal inflation, under-inflation, or over-inflation.

In some embodiments of the present invention, the data is processed to find the row of data which contains the highest reading, and then an average is taken of the data readings in that row which are within the tyre footprint so as to provide the required representative value. In a preferred arrangement, this is a weighted average, to provide a greater weighting to readings within the centre of the tyre. Thus, for example, a weighting profile could be such that the weighting increases from 0 to a maximum over a certain percentage of the tyre footprint width, such as between 20% and 45%, remains at that maximum and then decreases to 0 over the remaining percentage of the tyre footprint width, such as between 20% and 45%. Generally the profile of the weighting will be symmetrical, for example rising from 0 over 40%, remaining at the maximum over 20%, and falling to 0 over the remaining 40%. It will be appreciated that by a "row" of data is meant the outputs from the sensor members at a particular moment during sampling.

Thus, in some embodiments of the invention, there is a longitudinal profile of sensitivity, when considering a pair of aligned sensor members, which rises gradually from a minimum to a maximum in the middle of the array and falls gradually to a minimum again, and there is a lateral profile of weighting which rises gradually from a minimum at one edge of the tyre footprint to a maximum in a central region, and then falls gradually to a minimum again.

The representative load value determined as outlined above can be used as the value of F in Equation 2, $P=aF^b+cW^d+e$, so as to provide the tyre pressure. It can also be used in a simpler method, for example where there is no load sensing system for the overall load such as load cells between a base and platform carrying the lateral array of sensors. Thus the representative load value could be used as the value of F in Equation 1, $P=aFs+b$.

In general, the representative load value can be used in an equation which calculates the tyre pressure as a function of the weight, without the total load, or as a function of both the weight and the total load. In either case, the function may include other variables such as temperature or speed.

In some embodiments of the invention, the processing module samples the outputs from the sensing systems of the sensor members within the tyre footprint simultaneously at intervals as the tyre moves over the array, determines a representative value of the load on a sensor member and determines the tyre pressure as a function of that representative load value. The processing module is configured to select a sample containing a sensor output which is no lower than any other sensor output in the samples taken, and to determine a weighted average of the outputs within the selected sample, the weighting being highest for outputs from sensors in a central region of the tyre footprint and lowest for outputs of sensors at the edges of the tyre footprint, the weighted average being used as the representative load value.

In general, the sample chosen will contain the highest sensor output from all the samples. However, there may be two or more samples each containing the highest sensor output, and in that case a choice may be made of one or more or all of them. There may be chosen deliberately a plurality of samples, one of which includes the highest sensor output and others of which contain other sensor outputs which are also relatively high compared to the remaining sensor outputs. In any event, in the case of there being a plurality of samples being selected, there may be calculated the representative load value from each sample and then an average taken.

In some embodiments of the invention, the load from a tyre is applied along an elongate portion of a sensor member over at least about 20% of the length of the elongate sensor member, and/or over at least about 10 mm of that length. The force applied to a sensor member preferably exceeds a threshold value which may be for example between 0 and about 50 kPa, for example between about 20 and 25 kPa In some embodiments of the invention, when analysing the data from the load sensing systems of the sensor members, it is necessary to identify and distinguish between data that relates to the presence of a tyre, and data that relates to general background noise. It is also necessary to distinguish between areas within the footprint of the tyre where there is no output because of the presence of a tread gap in the surface of the tyre, and areas where there is no output because they are outside the footprint of the tyre. Particularly in the case of commercial vehicles, there may be two wheels mounted adjacent each other on an axle, and it is necessary to identify that there are two distinct tyres, rather than one tyre with a large gap in the tread. As the vehicle passes over the array it is necessary to identify the different wheels as they pass over the apparatus. These may be spaced longitudinally and/or laterally of each other. It is also necessary to determine whether there is a single vehicle, or one vehicle closely following another.

In some embodiments of the invention, this is achieved by analysing the data using techniques known in the field of image processing, such as "segmentation" or "connected component analysis". Using connected component analysis it is possible to use a dynamic segmentation threshold to distinguish between general background noise and signals relating to a tyre. The technique makes it possible to identify the outline of an individual tyre patch as a vehicle passes over the array. However, and particularly in conjunction with the total load measurement, the analysis can also determine the following:

The location of each tyre contact patch.
The number of tyres.
The length of each tyre contact patch.
The tyre widths.
Tyre tread gaps and their position within a tyre contact patch.
The direction angle at which the vehicle approached the apparatus from.
The half-axle each tyre is associated with.
The load on each axle.
The load on each tyre.

The number of axles.
The axle widths.
The vehicle's speed at each half axle.
The approximate total vehicle speed.
The acceleration between axles.
The distance between axles.

In some embodiments of the invention, the apparatus is used in conjunction with a system that identifies a vehicle and stores data about that vehicle. The data collected can be compared with data collected previously and used to detect any changes. For example, information about tyre tread gaps and their positions within a tyre contact patch which can be compared with previous data to determine if a tyre has been changed.

The data processing system can be intelligent and make some assumptions about readings, before results are given. For example, the system can determine whether there are outputs caused by a stray animal walking over the array. The system can analyse the profile of the contact patch and/or the arrangement of tread gaps, and make assumptions about the type of vehicle or type of tyre, which can be used to set different values for the constants in an equation.

In some embodiments of the invention, an installation may comprise a number of the sensor arrays, positioned in any desired configuration. In some embodiments there may be a plurality of the apparatuses, butted up to each other. For example, this could be done on a garage forecourt entrance or to cope with aircraft tyres on the apron of an airport terminal.

Some embodiments of the invention will now be described by way of example and with reference to the accompanying drawings, in which.

Figure 1:
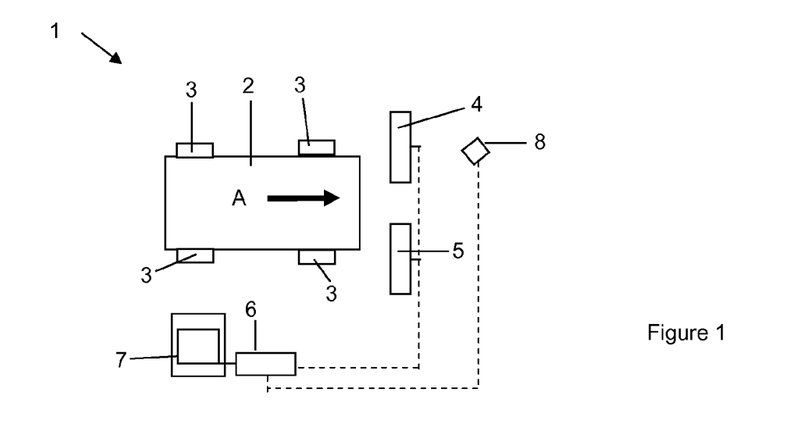
FIG. 1 is a diagrammatic view of a tyre pressure measuring system in accordance with the invention.

Referring now to FIG. 1, a system 1 is used to determine tyre characteristics for a vehicle 2 having four wheels 3, moving in the direction of arrow A. The system includes sensor apparatus 4 for the left hand wheels of the vehicle and sensor apparatus 5 for the right hand side. These are identical and are linked to a data processing unit 6 with a display 7. Also provided is a digital camera 8 linked to optical character recognition software running on data processing unit 6. The camera data could be used to detect the presence of a vehicle although preferably a magnetic sensor is used. The camera forwards an image of the vehicle registration plate to the data processing unit, as the vehicle approaches the apparatus, which identifies the vehicle registration number, and retrieves any parameters stored for that vehicle that may be required in calculating the tyre pressure accurately. As the vehicle wheels pass over the sensor apparatus 4 and 5, the data from various sensor outputs is sampled at about 525 to 530 Hz and the data is passed to the data processing unit for use in the manner described later. The data processing unit may be linked to the Internet by means of a wired or wireless connection.

Figure 2:
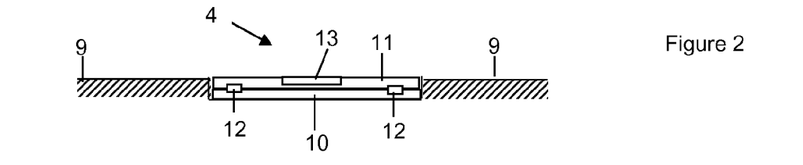
FIG. 2 is a diagrammatic cross section of apparatus used in the system of FIG. 1.
Figure 3:
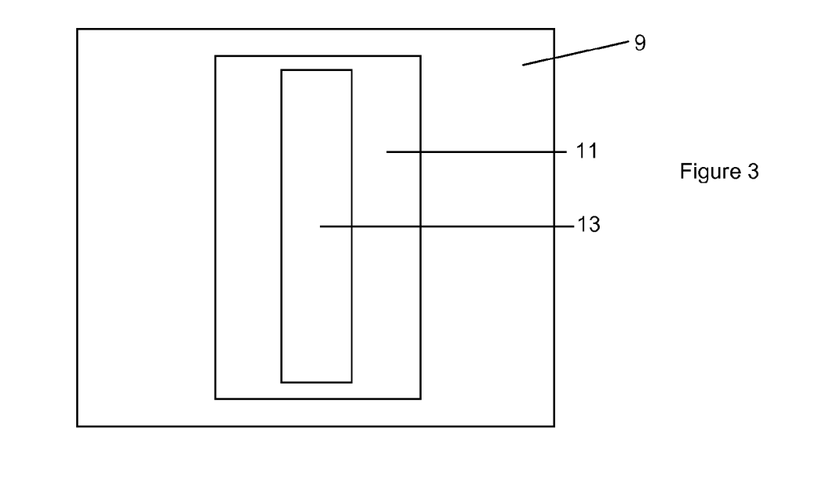
FIG. 3 is a plan view of apparatus used in the system of FIG. 1.

Sensor apparatus 4 will be described in detail, for reasons of simplicity. Sensor apparatus 5 is identical. As shown in FIGS. 2 and 3, the apparatus 4 is sunk in a vehicle bearing surface 9, such as an area of paving, concrete or tarmac, and comprises a base 10, a platform 11 mounted on the base through load cells 12, and a lateral array of sensors 13. The upper surface of the array of sensors is level with the upper surface of the platform 11, and also generally level with the vehicle bearing surface 9. The vehicle bearing surface could be raised relative to a surrounding area.

Figure 4:
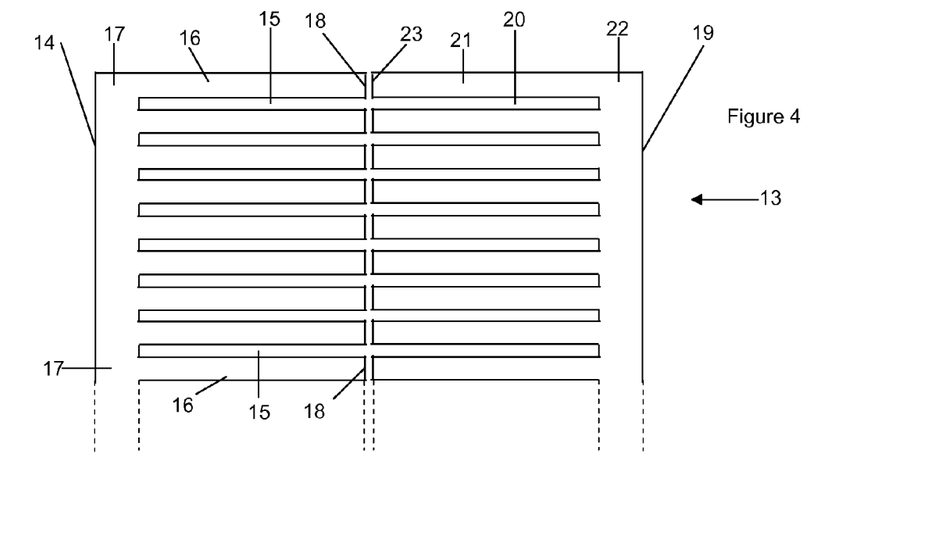
FIG. 4 is a diagrammatic view of part of an array of sensor members used in the apparatus of FIGS. 2 and 3.
Figure 5:
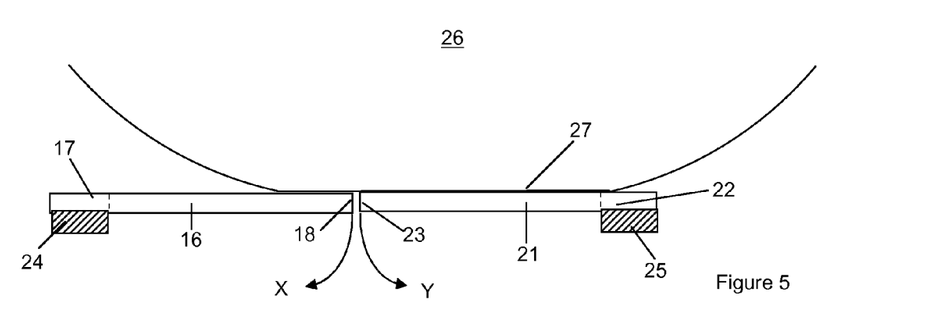
FIG. 5 is an end view of the array of sensor members, with a tyre in position on the sensor members.

The array 13 of sensors is shown in more detail in FIGS. 4 and 5. There are two sets 14 and 19 of aligned, facing sensor members. The set 14 of sensor members is formed by slits 15 cut into a plate of steel or other metal to form fingers 16 connected in cantilevered fashion to a base portion 17, with which they are integral, and extending in the direction of intended vehicle movement to a free end 18. The slits are parallel, of equal width, and spaced from each other or from the edge of the sheet by equal amounts to define fingers 16 of equal width. The set 19 of sensor members is formed by slits 20 cut into a plate of steel or other metal to form fingers 21 connected in cantilevered fashion to a base portion 22, with which they are integral, and extending in reverse of the direction of intended vehicle movement to a free end 23. The slits are parallel, of equal width to each other and to the slits 15, and spaced from each other or from the edge of the sheet by equal amounts to define fingers 21 of equal width to each other and to fingers 16. The two plates of steel or other metal are of equal thickness. The fingers of the two sets are aligned and the free ends 18 and 23 are closely adjacent. In some embodiments, the plates are 12 mm thick, the slits 15 and 20 are 0.8 mm wide, the fingers 16 and 21 are 7.2 mm wide, the fingers are 50 mm long from their connections to the base portions 17 and 22, and the free ends 18 and 23 are spaced 1 mm from each other. Parts only of the sets 14 and 19 are shown.

Figure 6:
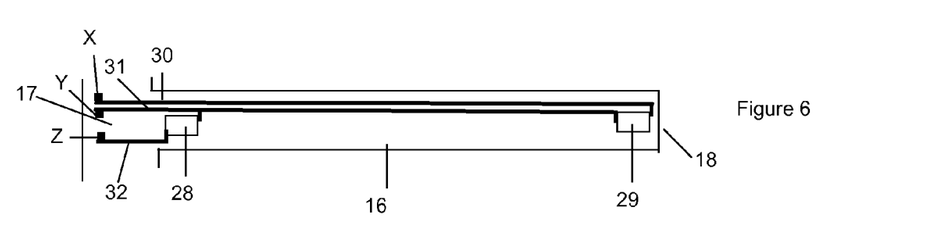
FIG. 6 is an underneath view of a single sensor member showing a load measuring system.
Figure 7:
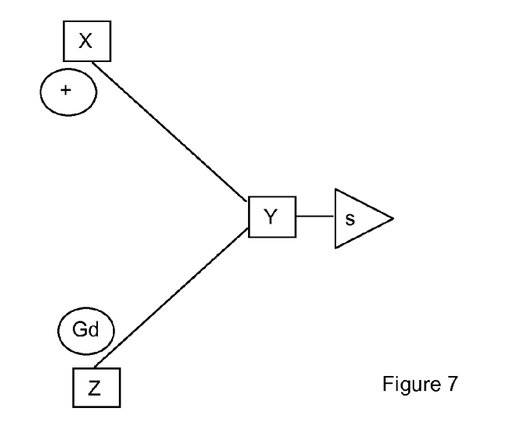
FIG. 7 is a diagram showing how the outputs from load sensing portions are used.

As shown in FIG. 5, when a tyre 26 of a vehicle rolls over the apparatus, its footprint 27 bears down on the sets of sensors over elongate portions of the fingers 16 and 21. The base portion 17 of finger 16 is connected to the body of the platform 11 at 24 and the base portion 22 of finger 21 is connected to the body of the platform 11 at 25. The force of the tyre 26 imposes a moment on finger 16 acting in the direction of arrow X and a moment on finger 21 acting in the direction of arrow Y. As shown in FIG. 6, on the underside of finger 16 is a load sensing system. Finger 16 is provided with two sensing elements 28 and 29 in the form of thick film portions printed on the underneath of the finger 16, one adjacent to the base of the finger and one adjacent the free end. These are connected to tracks 30, 31 and 32, giving terminals X, Y and Z. As shown in FIG. 7, these are used to connect the sensing elements in a half bridge, with the positive supply being connected to terminal X, the ground to terminal Z, and the output signal s being provided from terminal Y. In some cases the various components may be printed directly onto the metal of the fingers, building up layers of non-conductive, conductive and resistive materials as required. In some cases it may be possible to print these features onto a suitable film material e.g. plastic, glass or ceramic and then to laminate this onto the metal. The laminating process may be, for example, chemical, ultra violet or heat and pressure.

Figure 8:
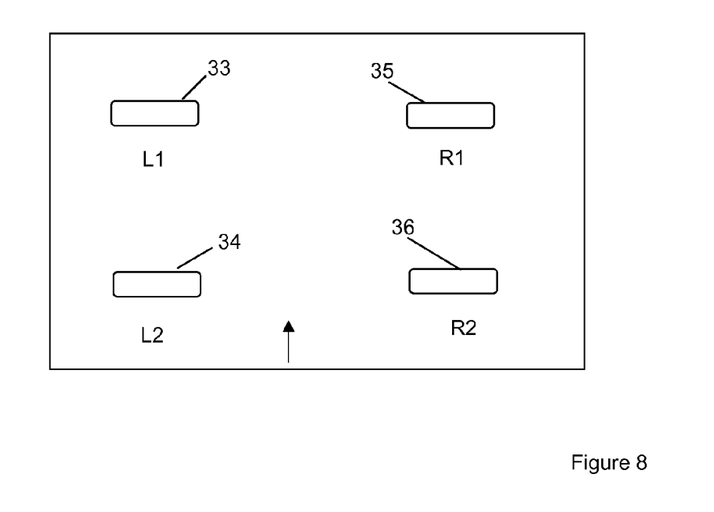
FIG. 8 shows diagrammatically how the tyre footprints are displayed.
Figure 9:
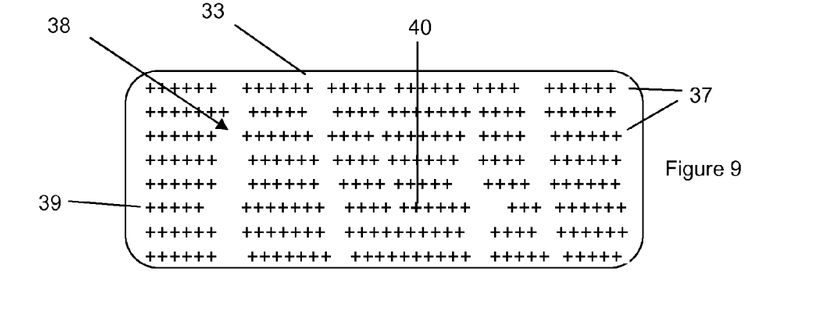
FIG. 9 shows sensor outputs within the outline of a tyre footprint.
Figure 10:
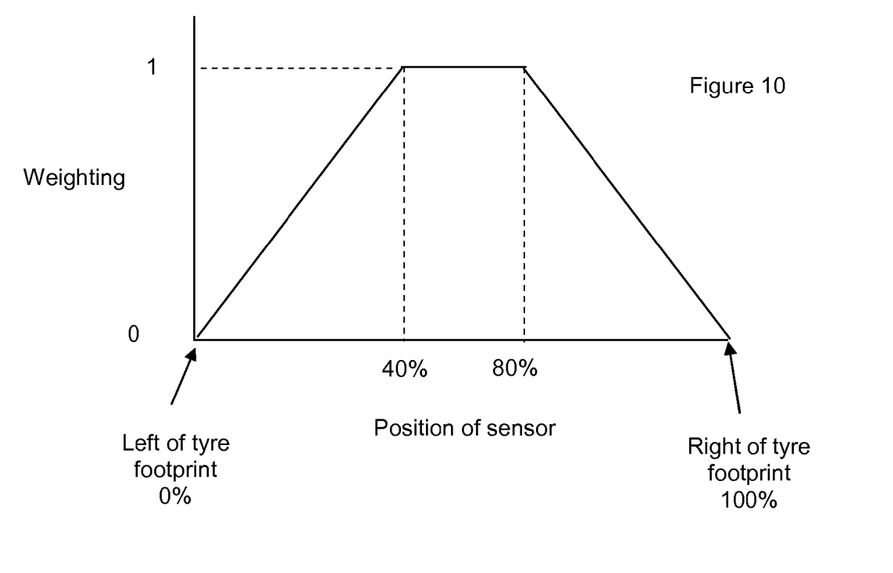
FIG. 10 shows how weighting is applied.

FIG. 8 shows in diagrammatic form the output from the system after the outlines of the tyre footprints have been isolated using a connected component analysis algorithm. The outlines of the tyre footprints 33, 34 35 and 36 have been displayed, with a legend identifying them as L1, L2, R1 and R2, where L is left, R is right and 1 and 2 denote the first axle and the second axle respectively. Within each of these footprints there is a distribution of force data from the sensor members, as shown diagrammatically and not to scale in FIG. 9. The tyre footprint 33 is shown, together with rows 37 of "+" symbols that represent the outputs of individual sensor members that are above the threshold value—in this case, the summed outputs from a pair of facing sensor members. Where there are gaps 38 with no symbols, these represent regions of tyre tread gaps. Each row represents the data from a single sample and the individual readings in each row will have a range of different values. The system selects the row of data 39 containing the highest force reading 40 from a sensor member. The system then applies a weighted average profile to that row of data as indicated at in FIG. 10, with the maximum weighting being given to sensor outputs in the middle 20% of the tyre footprint. The weighted average of the sensor outputs is then obtained. For calculating the weighted average, all sensors within the tyre footprint are taken into account, including those whose outputs are below the threshold and are treated as having no output, because they are within a tread gap.

The system also determines the total load on the tyre using the outputs of the load cells 12 between the platform 11 and base 10, as shown in FIG. 2, at the same time as the sample for the selected row of data from the array 13.

Figure 11:
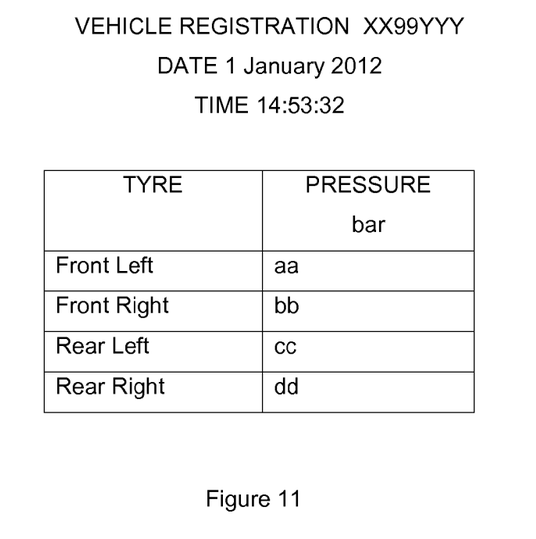
FIG. 11 shows how tyre pressure results may be indicated.

The weighted average is then used in the equation 2, $$P = aF^b + cW^d + e$$

with the weighted average being used as F and the total load on the tyre being used as W. Suitable values for the constants a, b, c, d and e are used. The result is the tyre pressure P. This is repeated for each of the remaining tyres, and the tyre pressures stored in association with an identifier for the vehicle, the time and date. The tyre pressures may also be displayed on the display screen 7 and/or printed, as shown in FIG. 11.

In one example, F is a pressure and a=0.9, b=1, c=0.0005, d=2 and e=−10.

For a tyre with a measured 300 Kg load W on it and a weighted average pressure F on a sensor member of 162 kPa, this provides a tyre inflation pressure of approximately 140 kPa which is roughly 20 PSI.

Figure 12:
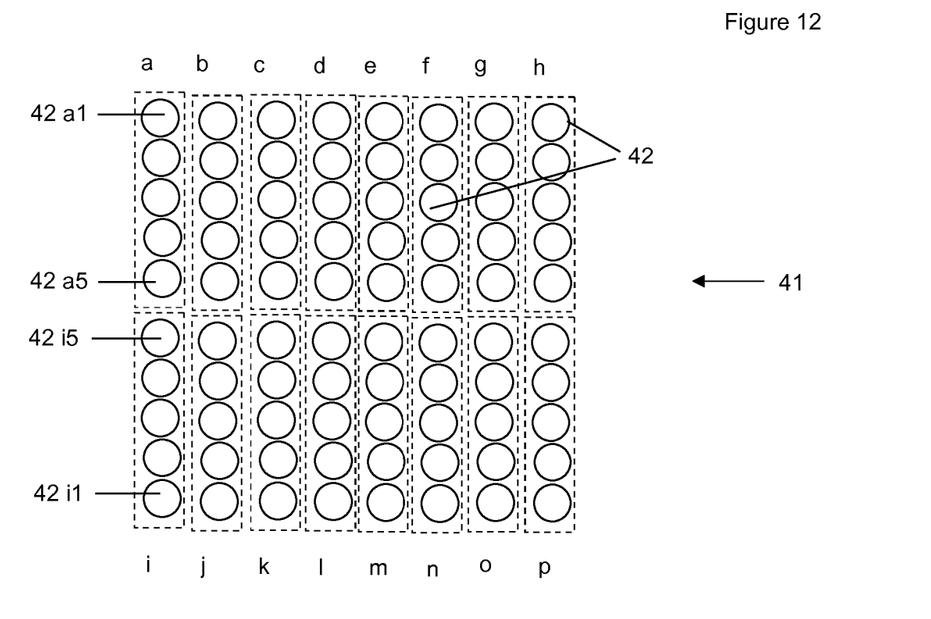
FIG. 12 shows an alternative sensor system.

FIG. 12 shows an alternative sensor system. Instead of two sets of opposing cantilevered beams, there is provided a regular two dimensional array 41 of discrete load sensing elements 42, arranged in rows and columns. In this particular embodiment each of the load sensing elements 42 is identical. The outputs from the load sensing elements are fed individually to the data processing unit. The load sensing elements are grouped together in longitudinal groups of five sensing elements, a to p to define sixteen sensor members. Groups a to h constitute a first set of eight sensors members and these are aligned opposite groups i to p which constitute a second set of eight sensor members. Each sensor member has increasing sensitivity from its free end to the end which meets the opposing sensor member. This is achieved by software in the data processing system allocating different weightings to the outputs of the individual sensing elements in a sensor member. Thus in sensor member (a), sensing element 42 $a1$ has the lowest sensitivity and sensing element 42 $a5$ has the highest sensitivity. In opposing sensor member (i), sensing element 42 $i5$ has the highest sensitivity has and sensing element 42 $i1$ has the lowest sensitivity. Thus there are effectively opposing virtual "cantilevered beams" which can emulate the performance of physical beams.

Embodiments of the invention thus provide an accurate way of calculating the inflation pressure of a tyre.

Thus, in embodiments of the invention there is provided a sensor array (13) for checking the pressure of a vehicle tyre whilst being moved over the array comprises two sets (14) and (19) of aligned, facing sensor members. The first set (14) of sensor members is formed by slits (15) cut into a plate of metal to form first fingers (16) connected in cantilevered fashion to a first base portion (17), which extend in the direction of intended vehicle movement to free ends (18). The second set (19) of sensor members is formed by slits (20) cut into a plate of metal to form second fingers (21) connected in cantilevered fashion to a second base portion (22), which extend in the reverse of the direction of intended vehicle movement to free ends (23). The fingers of the two sets are aligned and the free ends (18) and (23) are closely adjacent. Each finger is provided with a load sensing system (28, 29) which provides an indication of the load on the finger as the tyre moves over the finger. Loads are applied to different positions along the fingers as the tyre moves over the array. The sensitivity of the array increases from a minimum for a load applied where the first fingers (16) are attached to the first base portion (17), to a maximum adjacent the free ends (18, 23) of the first and second fingers (16) and (21), and then decreases to a minimum where the second fingers (21) are attached to the second base portion (22). The fingers may be replaced by series of individual sensing elements (42) arranged in groups, whose outputs are weighted so that the sensitivity varies in a similar manner.

It will be appreciated that the embodiments described are only by way of example and that the scope of the invention is as identified in the accompanying claims.

The invention may also be viewed from a number of alternative aspects and expressed in a number of different ways. Indeed the scope of the invention may differ from that currently defined in the claims.

For example, in connection with some embodiments of the invention a sensor member that is within the footprint of a tyre will have the load of the tyre applied along the length of the sensor member. However, this feature or its effects may be expressed in a number of different ways. For example it could be said that "a sensor member that is within the footprint of a tyre will have the load of the tyre applied at a number of points along the length of the sensor member", or that "a sensor member that is within the footprint of a tyre will have the load of the tyre applied at a number of points along an elongate portion of the sensor member". Alternatively it could be said that "the arrangement is such as a tyre moves across the array, the footprint of the tyre will bear directly on sensor members of the array".

Additionally or alternatively wording which defines the sensitivity characteristics of the sensor array, could state that each first sensor member is paired with a second sensor member and the combined sensitivity of a pair of a first sensor member and a second sensor member increases from a minimum adjacent the junction of the first sensor member with a first support, to a maximum in the region of where the first sensor member ends and the second sensor member begins, and then decreases from that region to a minimum adjacent the junction of the second sensor member with a second support.

Viewed from another aspect, the invention provides apparatus for checking the inflation pressure of a tyre whilst moving in an intended direction of travel, comprising a sensor array extending in a lateral direction with respect to the intended direction of travel, wherein the sensor array comprises a first set of laterally spaced first sensor members each of which is elongate and extends from a first support in a first longitudinal direction perpendicular to said lateral direction, and a second set of laterally spaced second sensor members each of which is elongate and extends from a second support in a second longitudinal direction opposite to said first longitudinal direction, the ends of the first sensor members remote from the first support being adjacent the ends of the second sensor members remote from the second support, wherein each sensor member is provided with a respective load sensing system which provides an output representing the load on the sensor member as a tyre moves over the array, and there is provided a processing module which processes outputs from the load sensing systems and provides data representing the pressure of the tyre; characterised in that the arrangement is such that a sensor member that is within the footprint of a tyre will have the load of the tyre applied along the length of the sensor member.

Viewed from another aspect, the invention provides apparatus for checking the inflation pressure of a tyre whilst moving in an intended direction of travel, comprising a sensor array extending in a lateral direction with respect to the intended direction of travel, wherein the sensor array comprises a first set of laterally spaced first sensor members each of which is elongate and extends from a first support in a first longitudinal direction perpendicular to said lateral direction, and a second set of laterally spaced second sensor members each of which is elongate and extends from a second support in a second longitudinal direction opposite to said first longitudinal direction, the ends of the first sensor members remote from the first support being adjacent the ends of the second sensor members remote from the second support, wherein each sensor member is provided with a respective load sensing system which provides an output representing the load on the sensor member as a tyre moves over the array, and there is provided a processing module which processes outputs from the load sensing systems and provides data representing the pressure of the tyre; characterised in that each first sensor member is paired with a second sensor member and the combined sensitivity of a pair of a first sensor member and a second sensor member increases from a minimum adjacent the junction of the first sensor member with the first support, to a maximum in the region of where the first sensor member ends and the second sensor member begins, and then decreases from that region to a minimum adjacent the junction of the second sensor member with the second support.

The preferred method of determining the representative load value as described earlier, is advantageous whatever the arrangement of the array of sensors. Thus, viewed from a further aspect, the invention provides apparatus for determining the inflation pressure of a vehicle tyre whilst being moved over the apparatus in a direction of travel, comprising an array of laterally spaced sensors, the array extending laterally of the intended direction of travel by an amount exceeding the width of the footprint of the tyre, each sensor providing an output which represents the load on the sensor as a tyre moves over the array, and there being a processing module which samples the outputs from the sensors within the tyre footprint simultaneously at intervals as the tyre moves over the array, determines a representative value of the load on a sensor and determines the tyre pressure as a function of that representative load value, wherein the processing module is configured to select a sample containing a sensor output which is no lower than any other sensor output in the samples taken, and to determine a weighted average of the outputs within the selected sample, the weighting being highest for outputs from sensors in a central region of the tyre footprint and lowest for outputs of sensors at the edges of the tyre footprint, the weighted average being used as the representative load value.

In some arrangements in accordance with this aspect of the invention, the processing module determines the tyre pressure as a function of both the representative load value and the total load borne by the tyre. This may be achieved by measuring the total load separately but preferably is achieved using a system as disclosed in WO 2010/142942 in which the array is mounted on a platform and there is a total load measuring system between the platform and a base. This may be sampled at intervals, and for example the total load value could be determined from an output from the total load measuring system in a sample taken at the same time as the sample used to determine the representative load value on the array of sensors.

The array of sensors may be as described in WO 2010/142942, in WO 2006/003467, or as described above in connection with the first aspect of the invention and may incorporate any or all of the optional features of the first aspect of the invention.

With reference to the various aspects of the invention discussed above, it will be appreciated that in some circumstances, it might be possible to dispense with one of the sets of sensor members of the array.

Thus, viewed from a further aspect the invention provides apparatus for checking the inflation pressure of a vehicle tyre whilst being moved over the apparatus in a direction of travel, comprising an array of laterally spaced sensor members, the array extending laterally of the intended direction of travel and each sensor member being elongate in the intended direction of travel, wherein each sensor member is provided with a respective load sensing system which detects the load on the sensor member as a tyre moves over the array, and a processing module which processes outputs from the load sensing systems and provides data representing the tyre pressure, wherein the array comprises a set of laterally spaced elongate sensor members each of which is connected to a support at one end and projects forwards in the intended direction of travel in cantilever fashion to a free end; and a sensor member that is within the footprint of a tyre has the load from the tyre applied along an elongate portion of the sensor member.

By having the load applied to the sensor members along their length, or such portion of it as is within the tyre footprint, this arrangement differs from that of WO 2010/142942 in which the sensor members are acted on at a single point by a separate actuator.

The feature that "a sensor member that is within the footprint of a tyre has the load from the tyre applied along an elongate portion of the sensor member" may be expressed in a number of different ways, as explained earlier. In another alternative, the wording could define the sensitivity characteristics of the sensor array, for example stating that this aspect of the invention is characterised in that "each first sensor member has a sensitivity which increases from a minimum adjacent the junction of the first sensor member with the first support, to a maximum in the region of where the first sensor member ends.

The various alternative aspects of the invention may be used in conjunction with any appropriate features of any other aspects of the invention and the optional features of those aspects. Thus, for example in some embodiments of the immediately preceding aspect of the invention there may be a second set of laterally spaced elongate second sensor members each of which is aligned axially with a respective first sensor member, with an end of each second sensor member being adjacent an end of its respective first sensor member.

The use of facing sets of sensor members with their ends adjacent, is advantageous even if the sensor members are not cantilevered sensor members.

Viewed from a further aspect, the invention provides apparatus for checking the inflation pressure of a tyre whilst moving in an intended direction of travel, comprising a sensor array extending in a lateral direction with respect to the intended direction of travel, wherein the sensor array comprises a first set of laterally spaced first sensor members each of which is elongate and extends in a first longitudinal direction perpendicular to said lateral direction to a first end, and a second set of laterally spaced second sensor members each of which is elongate and extends in a second longitudinal direction opposite to said first longitudinal direction to a second end, the first end of each first sensor members being adjacent and facing the second end of an associated second sensor member without being joined to that second end, wherein each sensor member is provided with a respective load sensing system which provides an output representing the load on the sensor member as a tyre moves over the array, and there is provided a processing module which processes outputs from the load sensing systems and provides data representing the pressure of the tyre, wherein the arrangement is such that a sensor member that is within the footprint of a tyre will have the load of the tyre applied along the length of the sensor member, and wherein the output from the load sensing system of a first sensor member is used together with the output from the load sensing system of the associated second sensor member so as to determine a representative value of the load on a sensor member in the array.

As noted above in relation to other aspects of the invention, the feature that "a sensor member that is within the footprint of a tyre has the load from the tyre applied along an elongate portion of the sensor member" may be expressed in a number of different ways. As for other aspects of the invention, by a "representative" load value is meant a value that is a reasonable indication of the load on a sensor member that is clear of interferences such as sidewall effects or tread gaps. The representative value could be, for example, that obtained from a sensor member providing the highest reading; an average (whether mean, median, mode and so forth) from a range of sensor members providing the highest readings; an average from a range of sensor members, excluding extreme values, low or high; an average from all sensor members; and so forth. In some embodiments of the invention, and as discussed earlier, a weighted average is used.

As for other aspects of the invention, the outputs from the individual sensor members of a pair of facing sensor members may be combined in a number of different ways, mathematically. For example, the outputs of a pair can be added together and that then used in the calculations, one stage in the calculations taking into account that the figures are for a pair of sensor members rather than a single sensor member. The outputs of the pair could be averaged and that average used in the calculations. Alternatively, the calculations could be carried out separately on the first set of sensor members, separately on the second set of sensor members, and then the two results averaged.

This aspect of the invention may be used in conjunction with any appropriate features of the other aspects of the invention and the optional features of those aspects.

The various aspects of the invention may be expressed as methods and by way of example only, viewed from a further aspect the invention provides a method of checking the inflation pressure of a tyre whilst moving in a direction of travel, comprising a sensor array extending in a lateral direction with respect to the direction of travel, wherein the sensor array comprises a first set of laterally spaced first sensor members each of which is elongate and extends from a first support in a first longitudinal direction perpendicular to said lateral direction, and a second set of laterally spaced second sensor members each of which is elongate and extends from a second support in a second longitudinal direction opposite to said first longitudinal direction, the ends of the first sensor members remote from the first support being adjacent the ends of the second sensor members remote from the second support, wherein each sensor member is provided with a respective load sensing system which provides an output representing the load on the sensor member as a tyre moves over the array, and there is provided a processing module which processes outputs from the load sensing systems and provides data representing the pressure of the tyre; characterised in that a sensor member that is within the footprint of a tyre will have the load of the tyre applied along the length of the sensor member.

Viewed from another aspect, the present invention provides apparatus for checking the inflation pressure of a vehicle tyre whilst moving in an intended direction of travel, comprising a sensor array extending in a lateral direction with respect to the intended direction of travel, wherein the sensor array comprises a first set of laterally spaced first sensor members each of which is elongate and extends from a first end to a second end in a first longitudinal direction perpendicular to said lateral direction, and a second set of laterally spaced second sensor members each of which is elongate and extends from a first end to a second end in a second longitudinal direction opposite to said first longitudinal direction, the second ends of the first sensor members being adjacent the second ends of the second sensor members, wherein each sensor member is provided with a respective load sensing system which provides an output representing the load on the sensor member as a tyre moves over the array, and there is provided a processing module which processes outputs from the load sensing systems and provides data representing the pressure of the tyre; wherein each first sensor member has a varying sensitivity which increases from a minimum at the first end of the first sensor member to a maximum at the second end of the first sensor member; and each second sensor member has a varying sensitivity which increases from a minimum at the first end of the second sensor member to a maximum at the second end of the second sensor member.

In some embodiments of the invention, the combined effect of the first and second sensor members is that when a tyre is moving in said intended direction of travel there will be increasing sensitivity from a minimum to a maximum as the tyre moves from the first end of the first sensor member to the second end of the first sensor member, followed by decreasing sensitivity from a maximum to a minimum as tyre moves from the second end of the second sensor member to the first end of the second sensor member.

In some embodiments of the present invention, there are first and second elongate sensor members. A tyre moves on to the first sensor member at the first end, then progresses towards the second end, and then moves off of it. The nature of the first sensor member is such that the sensitivity of the sensor member increases from a minimum at the first end, to a maximum at the second end. Thus, for a given load applied at the first end of the first sensor member, the sensor output will be less than if the same load is applied at the second end. Similarly, as the tyre moves off the second end of the first sensor member, it moves on to the second end of the second sensor member, then progresses towards the first end of the second sensor member, and then moves off of the second sensor member. The nature of the second sensor member is such that the sensitivity of the sensor member decreases from a maximum at the second end, to minimum at the first end. Thus, for a given load applied at the second end of second sensor member, the sensor output will be more than if the same load is applied at the first end.

It will be appreciated that by having an elongate sensor member with increasing sensitivity from its first end to its second end, effectively a weighting is applied to the outputs of the sensing system of the sensor member so that the weighting is a minimum at the first end and a maximum at the second end. Where there are second sensor members also, the array may be considered as comprising a laterally extending array of longitudinally extending combined sensor members. In such an arrangement, in some embodiments a weighting is applied to the outputs from the combined sensor members such that in the lateral direction the weighting increases from a minimum on one side of the array to a maximum in a central region of the array, and decreases from that central region of the array to a minimum on the other side of the array; and in the longitudinal direction the weighting increases from a minimum at one end of the array to a maximum in a central region of the array, and decreases from that central region of the array to a minimum at the other end of the array.

Thus, viewed from another aspect the invention provides apparatus for checking the inflation pressure of a tyre whilst moving in an intended direction of travel, comprising a sensor array extending in a lateral direction with respect to the intended direction of travel, wherein the sensor array comprises a set of laterally spaced longitudinally extending sensor members and each sensor member is provided with a respective load sensing system which provides an output representing the load on the sensor member as a tyre moves over the array, and there is provided a processing module which processes outputs from the load sensing systems and provides data representing the pressure of the tyre; wherein a weighting is applied to the outputs from the sensor members such that in the lateral direction the weighting increases from a minimum on one side of the array to a maximum in a central region of the array, and decreases from that central region of the array to a minimum on the other side of the array; and in the longitudinal direction the weighting increases from a minimum at one end of the array to a maximum in a central region of the array, and decreases from that central region of the array to a minimum at the other end of the array. Preferably, in the longitudinal direction the weighting is obtained by means of the sensor members having each having varying sensitivity in that longitudinal direction.

Although in some aspects of the invention the sensors members are said to extend perpendicularly to the lateral direction along which the array extends, in all aspects the sensor members could instead extend at an angle to true perpendicular. Thus, it can be said that the sensor array includes a plurality of laterally spaced sensor members each of which is elongate and extends from a first end to a second end in a longitudinal direction which extends sideways from said lateral direction.

The contents of WO 2010/142942 are incorporated herein by way of reference.

The invention claimed is:

1. A method of checking the inflation pressure of a vehicle tyre whilst moving the tyre in a direction of travel over a sensor array extending in a lateral direction with respect to the direction of travel, wherein the sensor array includes a plurality of laterally spaced sensor members each of which is elongate and extends from a first end to a second end in a longitudinal direction which extends sideways from said lateral direction, so that loads are applied to different positions along the sensor member as the tyre moves over the array; wherein each sensor member is provided with a respective load sensing system which provides an output representing the load on the sensor member as a tyre moves over the array, and there is provided a processing module which processes outputs from the load sensing systems of the sensor members and provides data representing the pressure of the tyre; and wherein the sensitivity of each sensor member increases from a minimum for a load applied at the first end of the sensor member, to a maximum for a load applied at the second end of the sensor member.

2. A method as claimed in claim 1, wherein the sensor array comprises a first set of laterally spaced first sensor members and an opposed second set of laterally spaced second sensor members, the second ends of the first sensor members being adjacent the second ends of the second sensor members.

3. A method as claimed in claim 2, wherein each first sensor member is aligned longitudinally with an associated second sensor member.

4. A method as claimed in claim 3, wherein the output from the load sensing system of a first sensor member is used together with the output from the load sensing system of the associated second sensor member.

5. A method as claimed in claim 3, wherein the output from the load sensing system of a first sensor member is used together with the output from the load sensing system of the opposed second sensor member.

6. A method as claimed in claim 2, wherein each of the sensor members is in the form of a beam which is connected to a support at the first end of the sensor member and projects in cantilever fashion to the second end of the sensor member.

7. A method as claimed in claim 6, wherein the second end of each first sensor member is a free end and the second end of each second sensor member is a free end.

8. A method as claimed in claim 7 wherein the first set of sensor members is defined by a first series of laterally spaced, longitudinally extending gaps which extend from an edge of a first plate of substantially rigid material to a first base portion so as to define a plurality of cantilevered beams, and the second set of sensor members is defined by a second series of laterally spaced, longitudinally extending gaps which extend from an edge of a second plate of substantially rigid material to a second base portion so as to define a plurality of cantilevered beams.

9. A method as claimed in claim 6, wherein each sensor member has an upper surface on which the load is applied, and a lower surface provided with one or more sensing portions spaced along its length, the or each sensing portion having electrical properties which vary in accordance with applied stress.

10. A method as claimed in claim 9, wherein the or each sensing portion is connected electrically in a bridge arrangement, and a circuit is provided for providing an electrical input to the bridge and for detecting an electrical output from the bridge.

11. A method as claimed in claim 10, wherein each sensor member has two sensing portions, connected as nodes in a half bridge arrangement.

12. A method as claimed in claim 2, wherein the sensitivity of the sensor array increases gradually from a minimum adjacent the first ends of the first sensor members, to a maximum in the region of the adjacent second ends of the first and second sensor members, and then decreases gradually from that maximum to a minimum adjacent the first ends of the second sensor members.

13. A method as claimed in claim 1, wherein each of the sensor members is in the form of a beam which is connected to a support at the first end of the sensor member and projects in cantilever fashion to the second end of the sensor member.

14. A method as claimed in claim 13 wherein the set of sensor members is defined by a series of laterally spaced, longitudinally extending gaps which extend from an edge of a plate of substantially rigid material to a base portion so as to define a cantilevered beam.

15. A method as claimed in claim 14, wherein each sensor member has an upper surface on which the load is applied, and a lower surface provided with one or more sensing portions spaced along its length, the or each sensing portion having electrical properties which vary in accordance with applied stress; and the or each sensing portion is connected electrically in a bridge arrangement; and a circuit is provided for providing an electrical input to the bridge and for detecting an electrical output from the bridge.

16. A method as claimed in claim 1, wherein each sensor member is in the form of a series of longitudinally spaced, discreet sensing elements so that loads are applied to different sensing elements of a sensor member as the tyre moves over the array, the outputs of the sensing elements having a sensitivity which increases from a minimum for a load applied to a sensing element at the first end of the sensor member, to a maximum for a load applied to a sensing element at the second end of the sensor member.

17. A method as claimed in claim 16, wherein the sensitivity is varied by manipulation of the outputs of the sensing elements to apply a weighting which is a minimum for a sensing element at the first end of the sensor member, to a maximum for a load applied to a sensing element at the second end of the first sensor member.

18. A method as claimed in claim 16, wherein the sensor array comprises a first set of laterally spaced first sensor members and an opposed second set of laterally spaced second sensor members, the second ends of the first sensor members being adjacent the second ends of the second sensor members.

19. A method as claimed in claim 18, wherein each first sensor member is aligned longitudinally with an associated second sensor member.

20. Apparatus for checking the inflation pressure of a vehicle tyre whilst moving in an intended direction of travel, comprising a sensor array extending in a lateral direction with respect to the intended direction of travel, wherein the sensor array includes a plurality of laterally spaced sensor members each of which comprises an elongate beam which extends from a first end to a second end in a longitudinal direction which extends sideways from said lateral direction, so that loads are applied to different positions along the beams as the tyre moves over the array; wherein each beam is provided with a respective load sensing system which provides an output representing the load on the beam as a tyre moves over the array, and there is provided a processing module which processes outputs from the load sensing systems of the beams and provides data representing the pressure of the tyre; and wherein (i) the sensor array comprises a first set of laterally spaced first sensor members and an opposed second set of laterally spaced second sensor members;
(ii) each of the first sensor members is in the form of a first beam having a first end and a second end; and each of the first beams is connected to a first support at the first end of the first beam and projects in cantilever fashion to the second end of the first beam; the sensitivity of each first sensor member increasing from a minimum for a load applied at the first end of the first beam, to a maximum for a load applied at the second end of the first beam; and
(iii) each of the second sensor members is in the form of a second beam having a first end and a second end; and each of the second beams is connected to a second support at the first end of the second beam and projects in cantilever fashion to the second end of the second beam; the second end of each second beam being adjacent the second end of an opposed first beam; the sensitivity of each second sensor member decreasing from a maximum for a load applied at the second end of the second beam, to a minimum for a load applied at the first end of the second beam.

21. Apparatus as claimed in claim 20, wherein each first beam is aligned longitudinally with an opposed second beam.

22. Apparatus for checking the inflation pressure of a vehicle tyre whilst moving in an intended direction of travel, comprising a sensor array extending in a lateral direction with respect to the intended direction of travel;
wherein the sensor array includes a plurality of laterally spaced sensor members each of which extends in a longitudinal direction which extends sideways from said lateral direction, so that loads are applied to different positions along the sensor members as the tyre moves over the array;
wherein each sensor member is provided with a respective load sensing system which provides an output representing the load on the sensor as a tyre moves over the array, and there is provided a processing module which processes outputs from the load sensing systems and provides data representing the pressure of the tyre; and
wherein each sensor member is in the form of a series of longitudinally spaced, discreet sensing elements so that loads are applied to different sensing elements of a sensor member as the tyre moves over the array, the outputs of the sensing elements having a sensitivity which increases from a minimum for a load applied to a sensing element at the first end of the sensor member, to a maximum for a load applied to a sensing element at the second end of the sensor member.

23. Apparatus as claimed in claim 22, wherein the sensitivity is varied by manipulation of the outputs of the sensing elements to apply a weighting which is a minimum for a sensing element at the first end of the sensor member, to a maximum for a load applied to a sensing element at the second end of the first sensor member.

24. Apparatus as claimed in claim 22, wherein the sensor array comprises a first set of laterally spaced first sensor members and an opposed second set of laterally spaced second sensor members, the second ends of the first sensor members being adjacent the second ends of the second sensor members, and wherein each first sensor member is aligned longitudinally with an associated second sensor member.

* * * * *